Feb. 20, 1951  M. L. CLOPTON  2,542,235
INDICATING MECHANISM
Filed April 27, 1946  4 Sheets-Sheet 3

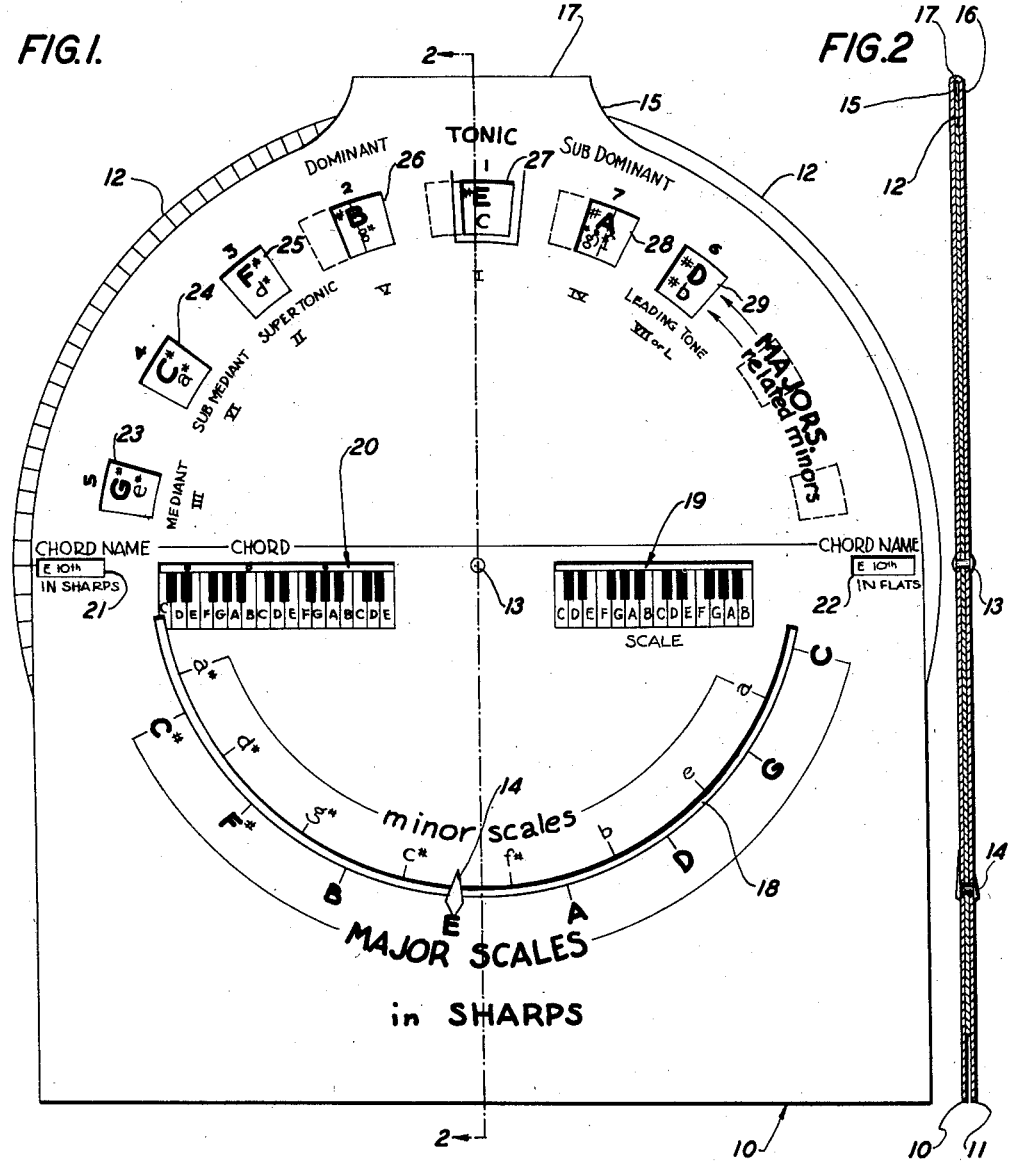

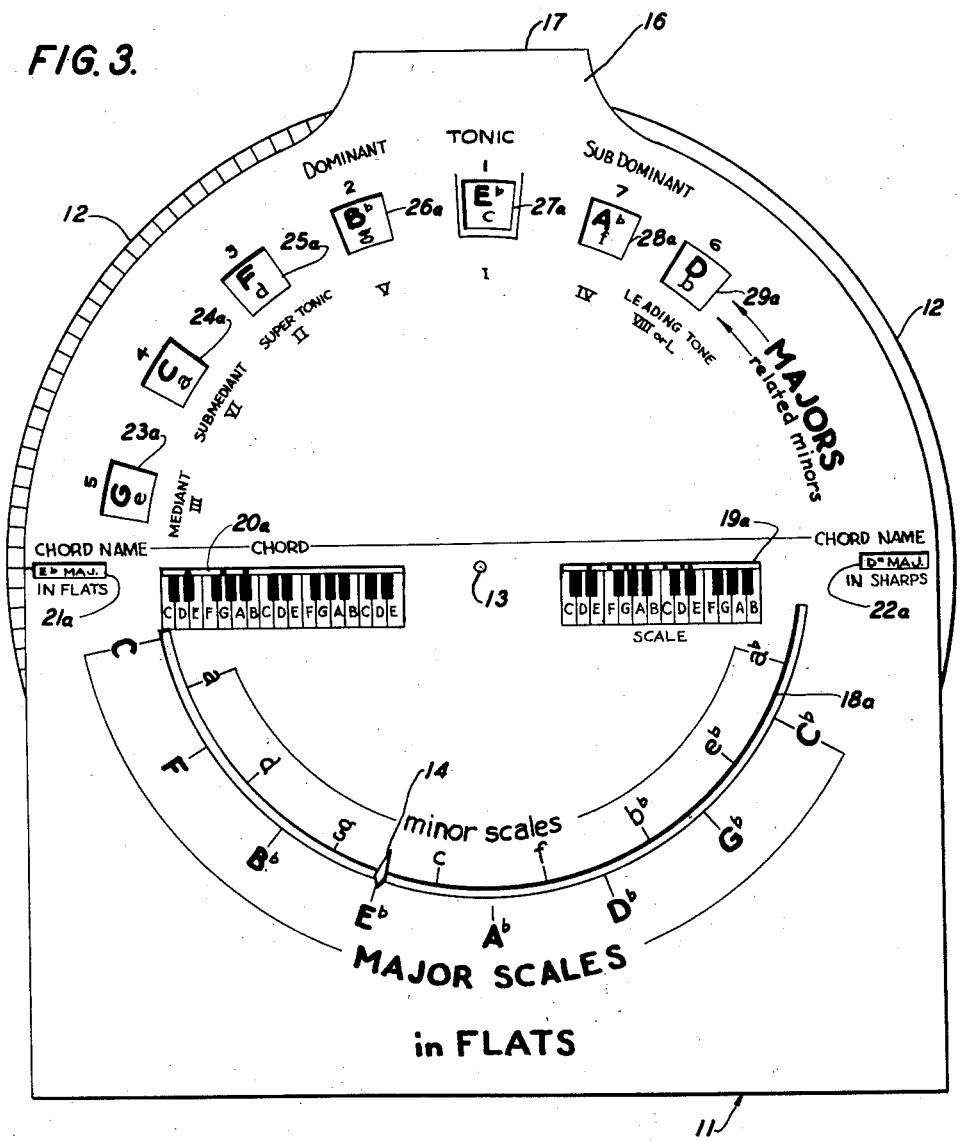

INVENTOR.
MORTIMER L. CLOPTON
BY
Christie and Angus
ATTORNEY

Feb. 20, 1951   M. L. CLOPTON   2,542,235
INDICATING MECHANISM

Filed April 27, 1946   4 Sheets-Sheet 4

INVENTOR.
MORTIMER L. CLOPTON

BY
*Christie and Angus*
ATTORNEY

Patented Feb. 20, 1951

2,542,235

UNITED STATES PATENT OFFICE 2,542,235

INDICATING MECHANISM

Mortimer L. Clopton, Los Angeles, Calif.

Application April 27, 1946, Serial No. 665,582

11 Claims. (Cl. 84—474)

This invention is concerned with musical charts and provides an improved structure for indicating the relationships between various musical elements, such for example as the chromatic scale, the major and minor scales or keys based thereon, the positions on an instrument keyboard corresponding to such scales and corresponding chord compositions. The device of the invention facilitates musical instruction, composition, transposition, improvisation and arrangement.

The order in which chords occur in harmony is predictable from a knowledge of the laws involved and from the so-called "circle of fifths." A musical scale may be rearranged into the circle of fifths as follows:

I or tonic
IV or sub-dominant
VII or (L) or leading tone
III or mediant
VI or sub-mediant
II or supertonic
V or dominant There are two basic harmony patterns; one in which chords progress clockwise around a portion of the circle of fifths, and the other in which the chords progress first clockwise and then counterclockwise around the circle. The latter is the simpler of the two and occurs when harmony proceeds from the tonic to the sub-dominant and back to the tonic. The former, in its simplest form occurs, when the harmony proceeds from tonic to dominant and back to the tonic, and its most complicated form occurs when the harmony proceeds from the tonic to the mediant, to the sub-mediant, to the supertonic, to the dominant and back to the tonic.

Each major scale has its related minor scale and each major chord has its related minor chord. When the alphabetical names of the tones of any musical scale are rearranged into the circle of fifths, and the names of their related minors are combined with them, the result is an excellent guide to the improvisation of harmony for any piece of music and makes possible the playing of music "by ear." The mind and ear may be trained in this manner so that in time such visual aids may be dispensed with altogether.

Accomplished musicians, through years of practice, eventually come to memorize (or perhaps to sense unconsciously) the relationships outlined above for each of the several keys, i. e. they recognize immediately the position of a given scale on a keyboard, the principal chords of that scale, and the use and arrangement of its notes in the circle of fifths. However, before that degree of proficiency is attained, there is need for a ready reference which gives the information at a glance, and composers and other experienced musicians are accustomed to employ some sort of reference in composition, transposition, improvisation and arrangement.

I have developed a visual aid for musical instruction, composition, et cetera which facilitates such operations to a greater extent than those available heretofore, and which provides in compact and convenient form a great variety of musical information so arranged that the eye discovers immediately the information required without the confusion and strain attendant upon the use of many prior devices.

In essence, the device of my invention comprises a face plate provided with a series of windows in which interrelated musical data appears as a dial is rotated. The dial or disc is rotatably mounted behind the face plate and carries a pointer which moves along an arc on the face plate that is graduated in terms of a series of scales or keys, for example by their alphabetical designations. A plurality of tables giving a variety of information with respect to each of these scales are printed on the dial in an arrangement such that when the pointer is turned to a given scale designation, various items of information relative thereto appear in the appropriately labelled windows or slots in the face plate. By way of example, in a preferred form of my device, the pointer may be turned to a given scale designation, say the key of C, and in one window of the face plate there appears above a keyboard chart for a given instrument (say, a piano) a graphic illustration (say a series of dots) showing how the notes of this key are placed on the keyboard; in another window there appears above a keyboard chart a graphic illustration (say a series of dots) of the principal chord built upon the tonic or other selected note of that key, and in the same or a different window or windows there appears the name of that chord, in sharps, in flats, or in both. In an additional set of windows spaced from each other along an arc on the face plate, (each labelled respectively in terms of unchanging note designations, i. e. those which do not change with key, for example—"Mediant, Sub-Mediant, Supertonic, Dominant, Tonic, Sub-Dominant or Leading Tone") notes or chords of the key selected appear in the order of the circle of fifths. The windows may be given equivalent labels in some other system of nomenclature which does not change with key, for example in that of the Roman numerals described previously, or in another system of nomenclature employing Arabic numerals which I have developed and which I describe hereinafter. If desired, related minors may be placed on the dial adjacent the respective major chords which appear in the windows.

The following table illustrates the information which may be obtained when the pointer on the dial is turned to the key of C.

| Name Window Labels | Mediant | Sub Mediant | Super Tonic | Dominant | Tonic | Sub Dominant | Leading Tone |
|---|---|---|---|---|---|---|---|
| Roman Numeral Window Labels | III | VI | II | V | I | IV | VII or L |
| Arabic Numeral Window Labels | 5 | 4 | 3 | 2 | 1 | 7 | 6 |
| Major Note or chord Appearing | E | A | D | G | C | F | B |
| Related Minor chord Appearing | c# | f# | b | e | a | d | g# |

If desired, the apparatus may have two face plates (fixed back to back) one devoted to scales (keys) in sharps and the other to scales (keys) in flats, with the rotatable dial mounted between them.

The keyboard graphic illustrations for chords and for scales which appear in the respective windows of the face plates as the dial is turned preferably are sets of dots, each set extending radially from the axis of the dial. The corresponding keyboard windows for chords and scales are also radial slots of such width that they mask all of the designations except the one corresponding to the pointer position.

These and other aspects of the invention will be completely understood in the light of the following detailed description, taken in conjunction with the accompanying drawings in which Fig. 1 is a front view of a preferred form of the apparatus graduated in sharps;

Fig. 2 is a sectional view of the apparatus taken along the line 2—2 of Fig. 1;

Fig. 3 is a rear view of the apparatus showing the rear face plate graduated in terms of flats;

Figure 4:
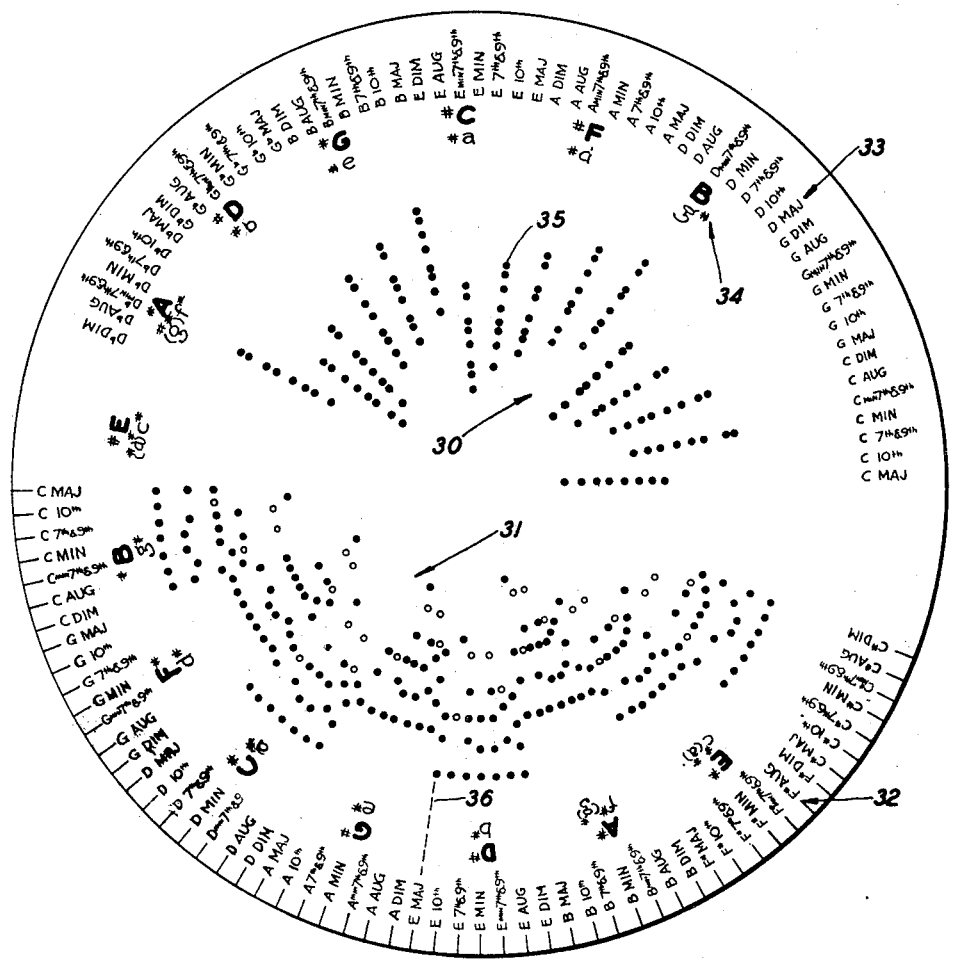
Fig. 4 is a front view of the dial of the apparatus showing the tabulated musical data which appears in order in the windows of the front face as the dial is rotated.

Referring to the drawings, the mechanical members comprise a front plate 10, a rear plate 11, a dial 12, a pin or axis member 13 and a pointer or marker 14 which may be a separate member (as shown) or marks on the dial which appear in slots in the respective plates. The plates and the dial are made of sheet material of adequate stiffness, say cardboard, plastic or thin metal. The dial is circular and is mounted between the face plates and parallel with them on the pin which passes centrally through all three. The pin conveniently is in the form of a rivet. The plates may be of any shape which gives access to the dial edge and permits it to be turned (or can cover it entirely if cranking means or the like is affixed to the dial in place of the pin). Preferably the plates are cut with square bottom corners and curved on a circular arc (drawn from the axis) in the top halves, with central projections 15, 16 which are fastened together at a hinge 17.

The front plate has a curved slot 18 in which the front of the pointer rides and which is graduated in terms of the scales in sharps, the minor scales being above and the major scales below in the following orders:

Major scales: C#, F#, B, E, A, D, G, C.
Minor scales: a#, d#, g#, c#, f#, b, e, a.

The front plate also has a radial slot 19 extending substantially horizontally to the right of the pivot and bearing a schematic diagram of a portion of a piano keyboard. It has a second horizontal radial slot 20 on the left hand side likewise bearing a schematic diagram of a portion of a piano keyboard, and two short radial slots 21, 22 in line with the others but close to the rim of the face plate, one labelled "chord name in sharps" and the other "chord name in flats."

Lastly, the front plate has a series of seven openings, or windows, 23, 24, 25, 26, 27, 28, 29 spaced in the upper half of the plate in an arc drawn from the axis and labelled respectively in a clockwise direction as follows:

| Window No. | Name | Roman Numeral | Arabic Numeral |
|---|---|---|---|
| 23 | Mediant | III | 5 |
| 24 | Sub Mediant | VI | 4 |
| 25 | Super Tonic | II | 3 |
| 26 | Dominant | V | 2 |
| 27 | Tonic | I | 1 |
| 28 | Sub Dominant | IV | 7 |
| 29 | Leading Tone | VII or "L" | 6 |

As shown in Fig. 4, the front face of the dial carries a plurality of tables so spaced around its axis that when the pointer is turned to a given key, the data pertinent to that key appears in the respective slots or windows of the front face. Thus when the pointer is placed opposite a given key on the arcuate slot 18, a line of dots (which is one line in a series 30 of such radial lines on the dial) appears in the "scale" slot 19 opposite the keyboard diagram of this slot. This gives immediately a visual indication of what notes comprise the scale of this key on the piano. Simultaneously a line of dots (which is one line in a series of such radial lines 31 on the dial) appears in the "chord" slot 20 and opposite the keyboard diagram of this slot. Some of the "chord" dots are black, and these indicate the essential notes of the chord selected. In some cases there are also white dots which indicate notes that are optional in the chord and may or may not be played.

At the same time that the chord dots appear in the chord window, the name of that chord in sharps appears in the left hand window 21 and the name in flats appears in the right hand window 22. The name which appears in the "sharp" window is part of a series 32 written in radial arrangement on the front face of the dial (Fig. 4) and the name which appears in the "flat" window is part of a series 33 written in radial arrangement on the opposite side of this front face.

The front face (Fig. 4) of the dial bears another set 34 of notations which appear in the "circle of fifths" windows for appropriate settings of the pointer. This series is in alphabetical terms according to the "sharp" modification and consists of an outer series of "major" chord designations with an inner series of "related minors" disposed inside the outer series and respectively opposite the individual designations thereof, both series being disposed on arcs drawn from the axis.

The alphabetical designations of the set 34 on the dial run clockwise according to the "circle of fifths" while the corresponding designations which serve to graduate the marker slot 18 on the front plate are in the same arrangement but run counterclockwise.

To consider the layout of the several tables on a dial face, that of Fig. 4 may be considered typical. Referring to this figure, it will be observed that the several tables bear certain angular relationships to each other. Thus for the key of E the designation "♯E" in the table 34 is disposed on a line drawn through the axis perpendicular to another line drawn through the axis from the notation "E maj." in the table 33 of the chord names in flats and "E maj." in the table 32 of the chord names in sharps. The graphical representation of the full scale of E appears at 35 on the dial on the second line and at right angles to the designation "♯E" in the table 34. The graphical representations of the chords built upon E appear to the left of the first line. Thus the graphical representation of the chord E major appears at 36 between the center and the marginal chord designation "E maj." of table 32 and on the second line perpendicular to the first line that passes through "♯E." The rest of the graphical representations of the chords built upon E appear radially in counter-clockwise arrangement starting from the construction line 36 passing through the designations of E major. The names of these chords in sharps likewise progress counterclockwise in a series starting from "E maj." and the names of these chords in flats also progresses counter-clockwise starting from "F♭ maj."

The same layout arrangement holds for any other key, for example the key of C, as may be seen by inspection.

As already indicated, the designations of the circle of fifths table (34) are arranged in that order. The complete circle of fifths is usually written

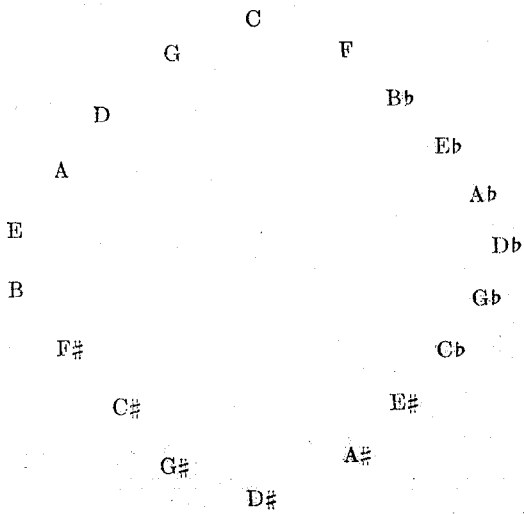

with a total of 19 notes arranged in a circle so that each one is the fifth of its neighbor on a selected side, say the right.

The apparatus of the invention can be constructed with the entire circle of fifths on one side of the dials; but as shown in the drawings, I prefer to confine one side to sharps plus natural notes (Fig. 4) and the other to natural notes plus flats (Fig. 5), so that each side has about ⅔ of the circle, but different ⅔ in each case.

The representations of the circle of fifths (tables 34, 34a) which appear in the respective series of windows on the upper half of the two face plates are specially arranged and cooperate with the windows so that they serve a dual function. To take table 34 as an example, its arrangement is as follows, reading clockwise

| | |
|---|---|
| E♯ | c♯♯ or (d) |
| A♯ | f♯♯ or (g) |
| D♯ | b♯ |
| G♯ | e♯ |
| C♯ | a♯ |
| F♯ | d♯ |
| ♯B | g♯ |
| ♯E | ♯♯c♯ (d) |
| ♯A | ♯♯f♯ (g) |
| ♯D | ♯b |
| ♯G | ♯e |
| ♯C | ♯a |
| ♯F | ♯d |
| B | g♯ |

The principal letters, i. e. the capitals, are spaced equi-angularly from each other around the arc and the sharp sign follows, i. e. is to the right of, the respective letter from E to F inclusive and leads, i. e. is to the left of, the letter from B to B inclusive. The cooperating windows (Fig. 1) are arranged to obscure certain sharp signs on occasion. Thus the first 6, numbered 23 to 28 inclusive are displaced to the right on the disc, and the last (29) is displaced to the left. The effect of this arrangement is as follows:

When the pointer is placed at C in the slot 18, the mediant of this key appears in window 23 as "E," but when the pointer is moved to F♯ in the slot 18, the same "E" preceded by a sharp sign or as "♯E" appears in window 29 as the leading tone. Thus the letter does double duty. Other examples of this phenomenon will appear through inspection. Thus the sub-dominant "B" which appears in the key of F♯ becomes the leading tone "♯B" in the key of C♯, etc.

In short, by displacing certain windows to the right of lines drawn equiangularly from the axis toward each window, and displacing others to the left of such lines, the flexibility of operation is greatly increased.

The same arrangement is employed on the rear or "flat" side of the apparatus. The windows 23a to 28a are displaced to the right and the window 29a is displaced to the left to cooperate with the table 34a in which the letters E to F have no sign while the letters B to B have the flat sign to their right hand sides.

The rear plate (Fig. 3) is graduated in terms of "flats," but in general arrangement is the same as that of the front plate with an arcuate slot 18a for the pointer, a radial slot 19a for whole scale designations, a radial slot 20a for chord keyboard designations, a radial slot 21a for the chord name in flats, a radial slot 22a for the chord name in sharps, and an arcuate series of windows 23a, 24a, 25a, 26a, 27a, 28a, 29a for the circle of fifths designations.

The rear face (Fig. 5) of the dial is similar in general arrangement to the front face of the dial (Fig. 4), being provided with a radial series 30a of dot sets representing whole scale appearances for the several scales, a second radial series 31a of dot sets representing chord appearances, a radial series 32a of chord names in sharps, a radial series 33a of chord names in flats, and a double series 34a with "majors" of the circle of fifths in terms of "flats" on an outside arc and "related minors" opposite them on the inside arc.

It will be noted in Fig. 1, wherein the windows of the circle of fifths on the rear face are shown in dotted lines, that these windows are not aligned with those of the front face but are offset.

In using the device of the invention, the fingers are placed lightly against the protruding edges of the disc or dial and it is turned until the pointer reaches the desired position in its slot.

To find a major scale on the piano keyboard, the pointer is placed at the corresponding designation on the slot 18 (or 18a) and the series of dots which appears in the window 19 (or 19a) shows the piano keys to be struck.

To find a major chord, the marker is set on the corresponding designation along the slot 18 (or 18a) and the notes to be struck appear as a set of dots in the window 20 (or 20a). Any other chord in that key may be found by moving the pointer from the above-determined position away from the C major end of the curved slot, whereupon the chords will appear in the window 20 (or 20a) in the following order: major, 10th, 7th and 9th, minor, minor 7th and 9th, augmented and diminished. The solid dots which appear over the chord keyboard indicate the notes which combine to make the chord, and the open or white dots mark notes that are optional. Thus in the 7th and 9th chords, the 9th is optional.

The names of the chords appear in their respective windows simultaneously with the keyboard designations.

The seven windows of the circle of fifths at the top of the face plate show the relationship between chords in any key to which the marker is set.

To take a specific illustration, assume that the front face, graduated in terms of sharps, is being employed and that the marker is set at C major, or simply "C." The keyboard window 19 shows that the notes of this key are C D E F G A B C. The chord window 20 shows that the major or principal chord is C E G, the chord name appearing as "C maj." in both windows 21 and 22. If now the pointer is moved clockwise away from "C" in the slot 18, the other chords of C appear as follows:

| Window 20 | Window 21 | Window 22 |
|---|---|---|
| C, (G optional) E | C 10th | C 10th |
| C, E, G, A# (D option) | C 7th and 9th | C 7th and 9th |
| C, D#, G | C Min | C Min |
| C, D#, G, A# (D option) | C Min 7th and 9th | C Min 7th and 9th |
| C, E, G# (A# option) | C Aug | C Aug |
| C, D#, F#, A | C dim | C dim. |

Returning the pointer to C major, the chord designations of this key appear in the circle of fifths window as follows:

| Name Designation | Roman Numeral | Arabic Numeral | Alphabetical Designation of Chords | |
|---|---|---|---|---|
| | | | Majors | Related Minors |
| Tonic | I | 1 | C | a |
| Dominant | V | 2 | G | e |
| Super Tonic | II | 3 | D | b |
| Sub Mediant | VI | 4 | A | f# |
| Mediant | III | 5 | E | c# |
| Leading Tone | VII or L | 6 | B | g# |
| Sub Dominant | IV | 7 | F | d |

To determine from the foregoing the appearance of any form of the dominant chord of C major on the piano keyboard, the pointer is turned to G, whereupon the piano keys to be struck to produce the major chord appear in the window 20. By turning the dial clockwise, all of the other chords built upon G appear in sequence.

Any other of the harmonically related cords in the circle of fifths for C major can be found in like manner.

The foregoing results are obtained because each note in the circle of fifths is the fifth of the neighbor on its right.

The Arabic numerals with which the circle of fifths windows are labelled are not conventional designations. I have adopted them as a more readable substitute for Roman designations and as a convenience for indicating harmony for compositions to be learned with the aid of the apparatus, and because it enables the student to learn transposition of music from one key to another and to play a given composition in any key selected.

In addition to the arabic numerals proper, certain small letters are employed to indicate the type of chord to use. If no small letter appears after a number, the major type of chord is meant. Thus "1" means the tonic major. The letter "s" indicates seventh; thus "2s" means the dominant seventh. The letter "m" indicates minor; thus "7m" means the sub-dominant minor. Similarly "a" is used to indicate an augmented chord and "d" to indicate a diminished chord.

For example, piano music to be played in chords may be written as follows:

1       7       1     2s     1
"Mid plea-sures and palaces though we may roam
  7       1       2s     1
Be it e-ver so humble there's no place like home
  7       1       2s     1
A charm from the skies seems to hallow us there
  7       1       2s     1
Which sought through the world is ne'er met with elsewhere"

By setting the apparatus to a given key, say the key of F#, the proper alphabetical designations of the chords appear in the windows of the circle of fifths and give a complete guide to transposition.

Figure 5:
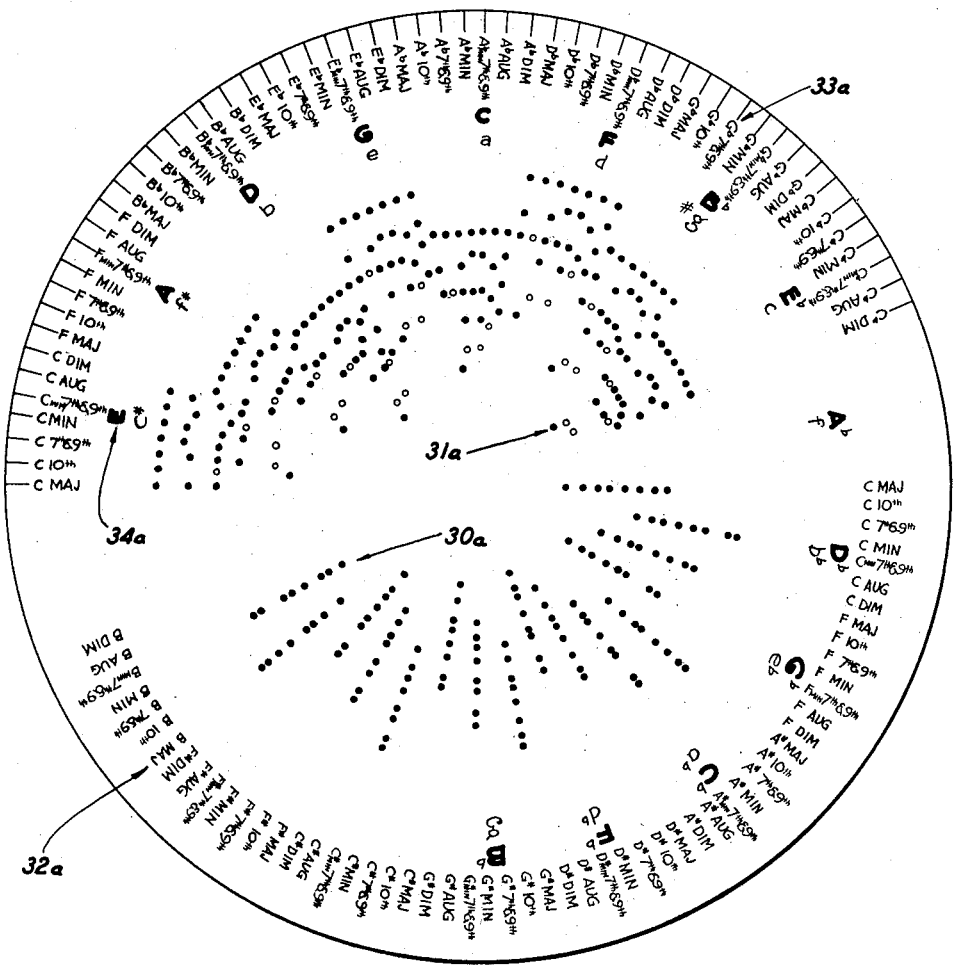
Fig. 5 is a rear view of the dial bearing the data which appears in order through the windows of the rear face as the dial is rotated.

Referring to Fig. 5 it will be observed that in the series of chord names 32a, those at the extreme right are called chords of C and chords of F. If desired, musical nomenclature permits C to be called B# and F to be called E sharp and the chord names may be altered correspondingly. The same remark applies to Fig. 4 where in series 33, the "B" chords may be designated "Cb" and the "E" chords "Fb."

I claim:

1. In apparatus of the class described, the combination which comprises a plate, and a dial disposed behind it substantially parallel therewith and rotatable with respect to the plate on an axis extending through plate and dial, the plate having delineated on its exposed face representations of the names of the musical scales arranged in the order of the circle of fifths and spaced from each other along an arc drawn from the axis and a series of windows spaced in an arc drawn from the axis, and a pointer on the dial and movable therewith along the representations of the names of the scales on the plate, the dial having delineated thereon representations of the notes of the scales and so located and spaced that when the pointer is rotated to a name of a scale on the plate, representations of the notes of the scale of which it is the tonic appear in the windows.

2. Apparatus according to claim 1 in which the windows are labeled according to a musical nomenclature which does not vary with change in key.

3. Apparatus according to claim 1 in which there are seven windows in the series labelled respectively and in order mediant, submediant, super tonic, dominant, tonic, subdominant and leading tone.

4. Apparatus according to claim 1 in which there are seven windows labelled respectively and in order III, VI, II, V, I, IV, VII.

5. Apparatus according to claim 1 in which there are seven windows labelled respectively and with Arabic numerals.

6. Apparatus according to claim 1 in which the representations of the notes delineated on the dial are provided with respective representations of related minor note designations delineated adjacent thereto, and the windows are of such size that both the sets of representations appear therein.

7. In apparatus of the class described, the combination which comprises a plate and a dial disposed behind it substantially parallel therewith on an axis extending through plate and dial, the plate having delineated on its exposed face representations of the names of the musical scales arranged in the order of the circle of fifths and spaced from each other along an arc drawn from the axis and a series of windows spaced in an arc drawn from the axis, the angular distance between windows being different in certain cases, and a pointer on the dial movable therewith along the representations on the plate, the dial having delineated thereon representations of the notes of the scale arranged in the order of the circle of fifths equiangularly along an arc drawn from the axis, certain of the latter representations being modified by signs selected from the group consisting of sharps and flats and appearing adjacent the respective representations and the window spacing being such that these signs are obscured by the windows in certain instances while permitting the representations themselves to appear.

8. In apparatus of the class described, the combination which comprises a plate and a dial lapped together and rotatable with respect to each other on an axis extending through them transverse to their major surfaces, the plate having delineated on its exposed face a series of key designations arranged in the order of the circle of fifths, spaced from each other along an arc drawn from the axis, and having an arcuate slot in association with the key designations, a pointer on the dial movable in said slot along the key designations delineated on the plate, a window located on a diameter of the plate, and a pictorial representation of a keyboard delineated on the plate in association with said window, the dial having delineated thereon a series of graphical representations in the form of a plurality of groups of radially spaced dots, the several groups of dots being spaced around the dial so that a keyboard representation corresponding to a selected key appears in said window when the pointer is aligned with that key designation on the plate.

9. An apparatus according to claim 8 wherein the series of graphical representations and the series of key designations are arranged so that one series extends clockwise and the other counter-clockwise.

10. An apparatus according to claim 8 wherein the plate is provided with a series of additional windows in an arc drawn from the axis thereof and the dial has delineated thereon representations of the notes of the musical scale arranged in the order of the circle of fifths and positioned to appear in the respective windows, when the pointer is rotated to the name of a key on the plate, to indicate the chords harmonically related to said key.

11. In apparatus of the class described, the combination which comprises a plate and a dial lapped together and rotatable with respect to each other on an axis extending through them transverse to their major surfaces, the plate having delineated on its exposed face a series of key designations arranged in the order of the circle of fifths, spaced from each other along an arc drawn from the axis, and having an arcuate slot in association with the key designations, a pointer on the dial movable in said slot along the key designations delineated on the plate, a pair of windows located on a diameter of the plate on opposite sides of its rotative center, and a pictorial representation of a keyboard delineated on the plate in association with each window, the dial having delineated thereon two series of graphical representations of each series in the form of a plurality of groups of radially spaced dots, the several groups of dots of each series being spaced around the dial so that a keyboard representation corresponding to a selected key appears in one of said windows when the pointer is aligned with that key designation on the plate and simultaneously a keyboard representation corresponding with a chord of that key appears in the other of said windows.

MORTIMER L. CLOPTON.

REFERENCES CITED

The following references are of record in the file of this patent:

UNITED STATES PATENTS

| Number | Name | Date |
| --- | --- | --- |
| 886,037 | Caldwell | Apr. 28, 1908 |
| 954,436 | Hunter | Apr. 12, 1910 |
| 1,017,045 | French et al. | Feb. 13, 1912 |
| 1,643,303 | Jones | Sept. 27, 1927 |